United States Patent [19]
Kreamer et al.

[11] Patent Number: 5,600,652
[45] Date of Patent: Feb. 4, 1997

[54] LOCAL AREA NETWORK OPERATING IN THE ASYNCHRONOUS TRANSFER MODE (ATM)

[75] Inventors: Rolf Kreamer, Herzogenrath-Pannesheide; Yonggang Du; Hans-Jürgen Reuerman, both of Aachen, all of Germany; Marinus Bakker, Wijlre, Netherlands; Klaus-Peter May; Joachim Kahlert, both of Aachen, Germany; Andries Van Wageningen, Wijlre, Netherlands

[73] Assignee: U.S. Philips Corporation, New York, N.Y.

[21] Appl. No.: 458,205

[22] Filed: Jun. 2, 1995

[30] Foreign Application Priority Data

Jun. 3, 1994 [DE] Germany ............... 44 19 343.2

[51] Int. Cl.⁶ .................................................. H04L 12/42
[52] U.S. Cl. .......................................... 370/396; 370/403
[58] Field of Search ................................ 370/60.1, 68.1, 370/85.15, 94.2, 110.1

[56] References Cited

U.S. PATENT DOCUMENTS 5,140,587  8/1992  Mueller et al. ................. 370/85.15
5,339,317  8/1994  Tanaka et al. ................. 370/85.15
5,392,286  2/1995  Tanaka et al. ................. 370/94.1
5,444,702  8/1995  Burnett et al. ................ 370/60.1
5,479,402 12/1995  Hata et al. .................... 370/60.1
5,490,138  2/1996  Niestegge et al. ............ 370/56

OTHER PUBLICATIONS

"Ohne Chips nichts los—Standard-Chips fur ATM-Systeme sind im Kommen" AQ Bernd Reder, Elektronik Jan. 1993, pp. 66 to 75.

Primary Examiner—Douglas W. Olms
Assistant Examiner—Russel W. Blum
Attorney, Agent, or Firm—Michael E. Marion

[57] ABSTRACT

Local area network operating in the asynchronous transfer mode (ATM) comprising a plurality of stations which are coupled each via a network interface, which interface comprises a coupling device and a control arrangement and transmits cells via the coupling device between send and receive ring lines, to at least one station and at least one control arrangement. A control arrangement comprises an access controller which is arranged for conveying, in dependence on the contents of the header field of a cell received from the coupling device, the cell or first parts of the cell and/or additional information to a bus system and units coupled to the bus system.

9 Claims, 4 Drawing Sheets

LOCAL AREA NETWORK OPERATING IN THE ASYNCHRONOUS TRANSFER MODE (ATM)

BACKGROUND OF THE INVENTION

1. Field of the Invention

The invention relates to a local area network operating in the asynchronous transfer mode (ATM) comprising a plurality of stations which are coupled each via a network interface, which interface comprises a coupling device and a control arrangement and transmits cells via the coupling device between send and receive ring lines, to at least one station and at least one control arrangement.

2. Discussion of the Related Art

A local area network operating in the asynchronous transfer mode (ATM) is known from the publication "Ohne Chips nichts los—Standard-Chips für ATM-Systeme sind im Kommen" by Bernd Reder, Elektronik 1/1993, pages 66 to 75. That paper discusses the current situation of the development of integrated circuits for applications in local area networks, which networks operate in the asynchronous transfer mode (ATM). Each station is then connected to the ring lines of the local area network via the network interface. Switching devices (switches) are used in the network interfaces to control the ATM cell stream.

When an asynchronous transfer mode is used in a system, payload, for example, telephone, video or sound signals, is sent in blocks of a fixed length through arrangements for digital signal processing. By a block of a fixed length is meant a cell which contains a given number of bytes (for example, 53 bytes). Each cell contains a header field having a length of, for example, 5 bytes, and an information field which accommodates the payload and has a length of, for example, 48 bytes. In such a header field are available routing indicators, error recognition data and control data. Routing indicators are meant to be understood as trunk identifiers and link identifiers. The link identifier, also referenced VCI (Virtual Channel Identifier), contains the description of the destination of the cell in the system. To transmit a cell, a virtual channel is made available in response to the virtual channel identifier. As a rule, a VCI is changed each time a switching point is reached. A trunk group of various virtual channels is referenced a virtual path. A virtual path is identified by the trunk identifier. Such a virtual path is called a virtual path identifier (VPI). Cells are assigned to consecutively determined periods of time. The length of such a period of time depends on the clock rate used as a basis of the transfer components. If no payload is available, empty cells i.e. cells without payload, are transmitted in such a period of time. Cells containing payload are referenced payload cells.

A network interface of the local area network defined above may be coupled, for example, via a plurality of send and receive ring lines, to further network interfaces and also to a plurality of stations. A station may be, for example, a videophone, a personal computer, a workstation or a telephone. For control purposes there is at least one control arrangement available which usually comprises a bus system, a bus controller, memory modules, interfaces, an arithmetic-logic unit and so on. The control arrangement can transmit, for example, speech information accommodated in cells via an interface to a further unit, or be used for setting up or taking down connections. Such a control arrangement, however, cannot operate at the maximum available bit rate of the local area network. A cell stream that has a bit rate of, for example, 155 Mbit/s cannot be processed in the control arrangement with currently available technology. Nowadays a cell stream having a bit rate of about 10 Mbit/s can be processed in the control arrangement.

SUMMARY OF THE INVENTION

Therefore, it is an object of the invention to provide a local area network operating in the asynchronous transfer mode in which the processing rate of a cell stream in the control arrangement included in the network interface is increased.

The object of the invention is achieved by a local area network working in the asynchronous transfer mode and as defined in the opening paragraph in that a control arrangement comprises an access controller which is arranged for conveying, in dependence on the contents of the header field of a cell received from the coupling device, the cell or first parts of the cell and/or additional information to a bus system and units coupled to the bus system.

The increase of the processing rate of the cell stream in the control arrangement included in a network interface of the local area network according to the invention is achieved in that only those parts of a cell are conveyed to the bus system of the control arrangement which are necessary for the further processing. Then the contents of the header field are evaluated first and, in dependence on this evaluation, the required parts of the cell are conveyed to the bus system by an access controller. The evaluation of the header field of the cell may be effected, for example, in the access controller or in the coupling device or in a circuit upstream of the coupling device. A cell may also be conveyed in full. Furthermore, it is possible to convey only additional information to the bus system. This may be necessary, for example, for a settlement of charges related to a specific connection. The additional information may also be conveyed together with the cell or parts of the cell.

The access controller is furthermore provided for conveying the cell processed by at least one unit, or for conveying first parts of the cell processed in at least one unit and/or the non-processed cell or the non-processed remaining parts of the cell to the coupling device. Once a cell or first parts of the cell have been processed in the unit coupled to the bus system, the processed cell or the processed first parts of the cell is or are again conveyed to the coupling device via the access controller. It is also possible for a unit coupled to the bus system to convey a completely newly generated cell to the access controller to have it conveyed to the coupling device. The first parts of the cell which have been processed in a unit are combined with the non-processed remaining parts of the cell in the access controller and conveyed to the coupling device as a combined cell.

To make a combination of the non-processed and processed parts of a cell possible in a simple manner, a control arrangement comprises an input annex storage for buffering at least a cell received from the coupling device and an output annex storage for buffering at least a cell to be sent to the coupling device. The access controller is then provided for controlling the reading of a cell from the input annex storage and the writing of a cell in the output annex storage.

To control the transmission of a cell or of first parts of a cell to the bus system, there is a Table available which provides for the access controller the address of the first and the last byte of a cell to be transmitted to the bus system and/or additional information in dependence on the contents of the header field of the cell buffered in the input annex storage. Thus, in dependence on the contents of the header field of the cell buffered in the input annex storage, the information about the address of the first and the last transmit byte stored in the input annex storage is fed to the access controller. Additionally, the access controller is supplied with still available additional information. If a complete cell is to be transmitted, the memory locations of the input annex storage which contain the first and the last byte of the cell are mentioned as addresses.

An embodiment for the access controller comprises a first register for storing the additional information supplied by the Table, a first multiplexer for conveying the bytes of a cell coming from the input annex storage or additional information coming from the first register, a second multiplexer for conveying the bytes coming from the input annex storage or from the bus system to the output annex storage, a counter for producing addresses for the reading of bytes from the input annex storage and for changing its count after a byte of a cell has been read from the input annex storage, a comparator provided for controlling the multiplexer in dependence on the count and on the first and the last address of the bytes to be transmitted to the bus system.

Once a cell has been written in the input annex storage, a second register is used for receiving the address of the last byte to be transmitted and a third register as well as the up-counter for receiving the address of the first byte to be transmitted.

To control the reading from the input annex storage, the comparator is arranged for comparing the count of the counter with the contents of the second register, coupling, via the first multiplexer, the input annex storage to the bus system if the count is smaller than the contents of the second register and coupling, via the first multiplexer, the first register to the bus system if the count is equal than or larger than the contents of the second register.

To control the writing in the output annex storage, the comparator is arranged for resetting the counter to the address of the first byte of the cell, comparing the count with the contents of the second and third registers, coupling, via the first multiplexer, the input annex storage to the second multiplexer, coupling, via the second multiplexer, the output annex storage to the bus system if the count is larger than or equal to the contents of the third register and the count is smaller than or equal to the contents of the second register, or the contents of the registers or the count correspond to the address of the last byte of the cell, and coupling, via the second multiplexer, the output annex storage to the first multiplexer, if the count and the contents of the registers are equal to the address of the first byte of a cell, or the count is smaller than the contents of the second and third registers and the contents of the second register are unequal to the address of the last byte of the cell, or the count is larger than the contents of the second and third registers and the count is not larger than the address of the last byte of the cell.

The Table, which provides the address of the first and the last byte to be transmitted to the bus system as well as the additional information for the access controller, is addressed via a Table pointer. In a receiving circuit this Table pointer is added via a routing Table to a cell that has a control arrangement as its destination. A receive ring line, a connection delivering a cell from a station and a connection delivering a cell from a control arrangement are coupled to the coupling device via their own receiving circuits. The coupling device is provided for separating from the cell the Table pointer which serves as an address for an item of the contents of the Table and for feeding the Table pointer to the Table.

The invention likewise relates to a network interface for a local area network operating in the asynchronous transfer mode (ATM), to which interface at least one station is coupled and which comprises a coupling device and a control arrangement and transmits cells via the coupling device between send and receive ting lines, at least one station and at least one control arrangement. A control arrangement comprises an access controller which is provided for conveying the cell in dependence on the contents of the header field of a cell received from the coupling device or for conveying first parts of the cell and/or additional information to a bus system and units coupled to the bus system.

BRIEF DESCRIPTION OF THE DRAWINGS

These and other aspects of the invention will be apparent from and elucidated with reference to the embodiments described hereinafter.

In the drawings.

DETAILED DESCRIPTION OF THE PREFERRED EMBODIMENTS

Figure 1:
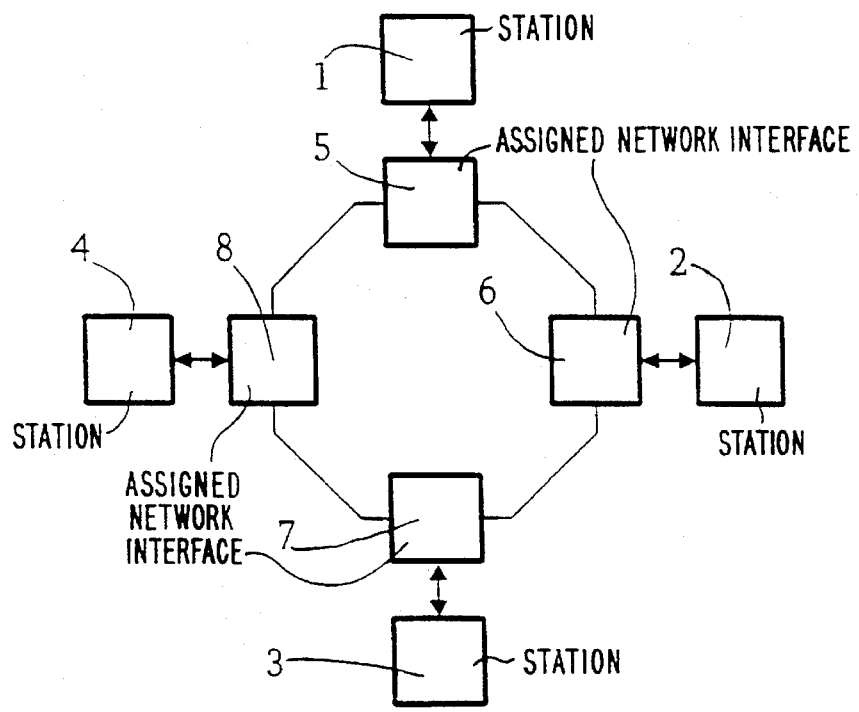
FIG. 1 shows a local area network.

FIG. 1 shows an illustrative embodiment for a local area network comprising four stations 1 to 4 which are coupled each to ting lines via assigned network interfaces 5 to 8. A station 1 to 4 may be, for example, a videophone, a personal computer or a workstation or telephone, respectively. The messages or information signals respectively, originating from the stations 1 to 4 or the network interfaces 5 to 8 are transmitted in the asynchronous transfer mode by means of cells. A cell contains a header field of 5 bytes and an information field of 48 bytes. The information contained in the header field of the cell is especially used for addressing and for executing switching functions.

Figure 2:
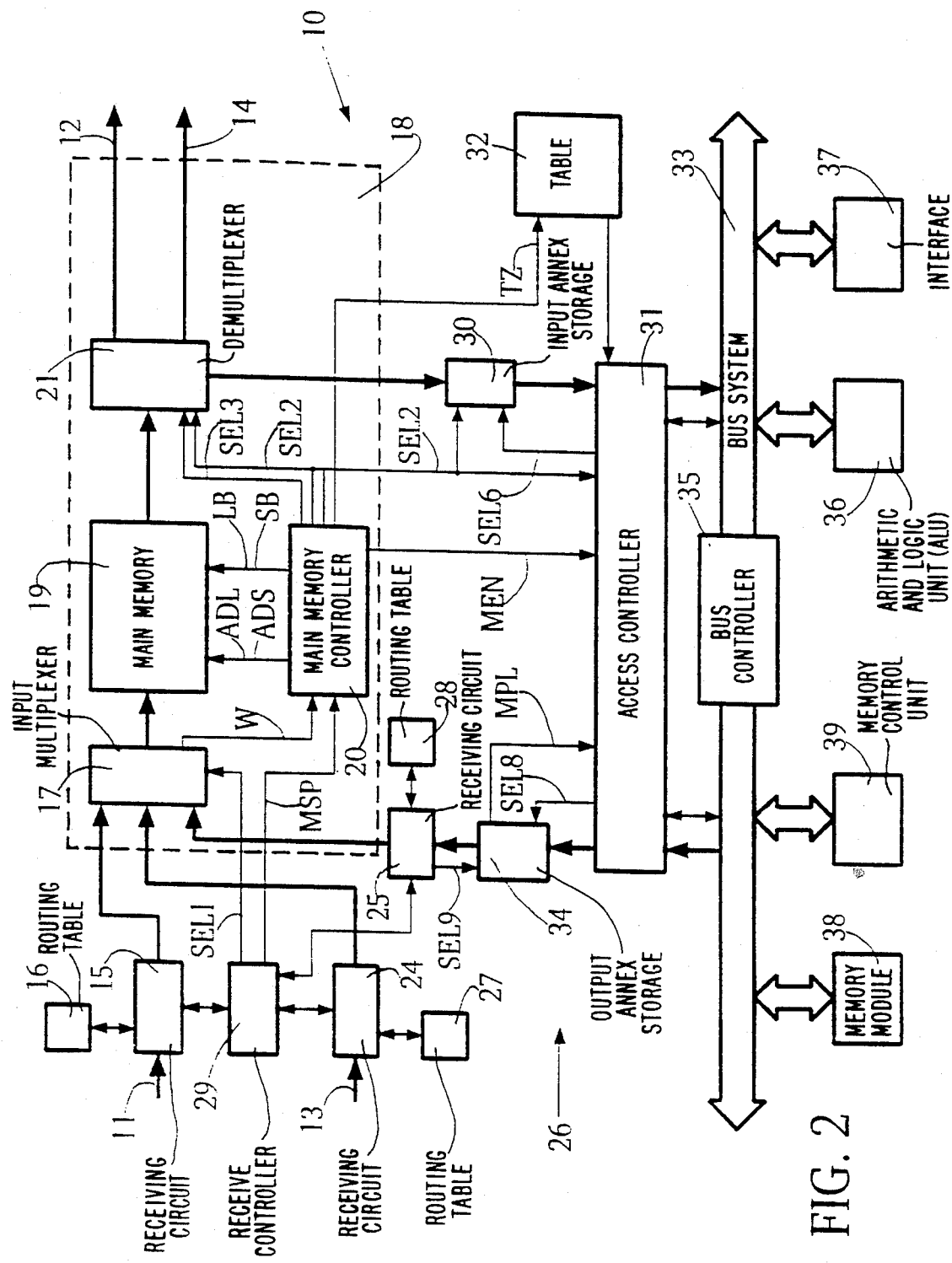
FIG. 2 shows a network interface that can be used in the local area network shown in FIG. 1.

FIG. 2 gives a detailed representation of a network interface 10 which is coupled, via a receive ring line 11 and send ring line 12, to further network interfaces and, via internal connections 13 and 14, to a station 1, 2, 3 or 4. A receiving circuit 15 included in the network interface 10 receives a cell stream from the receive ring line 11. In a buffer (not further shown) in the receiving circuit 15 is the cell stream at least adapted to an internal clock signal, a cell buffered, the header field of the cell evaluated, the information of the header field changed and routing indicator (tag) added to the cell. The routing indicator contains at least the destinations of the cell within the network interface 10 (for example, send ring line 12).

The receiving circuit 15 is connected to a routing Table 16 which supplies data to the receiving circuit 15 in dependence on information in the header field of a cell. For this purpose, certain parts of the data in the header field are used as a memory address for the routing Table 16, which Table supplies the data stored at the memory address to the receiving circuit 15. For example, a new address is inserted into the header field of a cell and the routing indicator W of, for example, 2 bytes is added to the cell.

The output of the receiving circuit 15 is coupled to an input multiplexer 17 which forms part of a coupling device 18. The coupling device 18 furthermore includes a main memory 19, a main memory controller 20 and a demultiplexer 21. The input multiplexer 17 directs the cells to a main memory 18, separates the routing indicator W from the received cell and transports this routing indicator to the main memory controller 20.

The input multiplexer 17 further receives cells from two more receiving circuits 24 and 25. The receiving circuit 25 is supplied with cells from the assigned station 1, 2, 3 or 4 via the internal connection 13 and with a cell stream from a control arrangement 26. The receiving circuits 24 and 25 operating in like manner to receiving circuit 15 are also connected to routing Tables 27 and 28.

The receiving circuits 15, 24 and 25 announce the arrival of a cell by means of a message signal MSP to a receive controller 29. The receive controller 29 sends a selection signal SEL1 to the input multiplexer 17 which connects one of its inputs to the input of the main memory 19 in response to the selection signal SEL1 and applies the routing indicator W of a cell conveyed to the main memory 19 to the main memory controller 20. Furthermore, the receive controller 29 switches release signals to the receiving circuits 15, 24 and 25 which signals cause a cell to be read from a receiving circuit 15, 24 or 25. The receive controller 29 cyclically releases a receiving circuit 15, 24 or 25 for a cell to be read out by the input multiplexer. Similar receiving circuits and receive controllers to the receiving circuits 15, 24 and 25 and the receive controller 29 are used in currently available ATM systems.

The main memory controller 20 supplies write addresses ADS to the main memory 19 during the write operation and releases, via a write release signal SB, the main memory 19 so that it can be written. Before that, the message that a cell is to be stored must have been received from the receive controller 29 via the message signal MSP. The read process is controlled in the main memory controller 20 in dependence on the received routing indicator. During the read operation the main memory controller 20 feeds the main memory 19 with read addresses ADL and releases via a read release signal LB the main memory 19 so that it can be read out.

A cell read from the main memory 19 is fed to the demultiplexer 21 which conveys a cell either to the send ring line 12, to the internal connection 14 or to an input annex storage 30. If a cell has reached the input annex storage 30, which forms part of the control arrangement 26, an access controller 31 included in the control arrangement 26 receives an appropriate message via a message signal MEN. Furthermore, selection signals SEL2 and SEL3 which control the demultiplexer 21 are applied to the demultiplexer 21 by the main memory controller 20.

The access controller 31 receives from a Table 32 information about which bytes of the cells stored in the input annex storage 30 are conveyed to a bus system 33 coupled to the access controller 31. Furthermore, additional information Z coming from the Table 32 with the selected bytes and/or additional information Z may be fed to the bus system 33 from the input annex storage 30 or Table 32. What data the Table 32 supplies to the bus system 33 depends on a Table pointer TZ supplied by the main memory controller 20. The Table pointer TZ is inserted into the routing indicator W which routing indicator is added to the cells in the receiving circuits 15 and 24. In the main memory controller 20 a Table pointer TZ is separated from the routing indicator W, buffered and applied to the Table 32 as an address.

The parts of the cell which are not fed to the bus system 33 are conveyed by the access controller 31 to an output annex storage 34 arranged between receiving circuit 25 and access controller 31. The bus system 33 comprises a bus controller 35, which controls the bus traffic between the access controller 31 and further units connected to the bus system 33, such as, for example, arithmetic and logic unit (ALU) 36, at least an interface 37, at least a memory module 38 and a memory control unit 39. The interface 37 is used, for example, for supplying and/or conveying information to a workstation or a personal computer. In the output annex storage 34 the bytes supplied by the bus system 33 to the access controller 31 (first, processed parts of the cell) are connected to the remaining parts of the cell supplied by the input annex storage 30 and buffered. The output annex storage 34 announces to the access controller 31 when a cell can be received.

Figure 3:
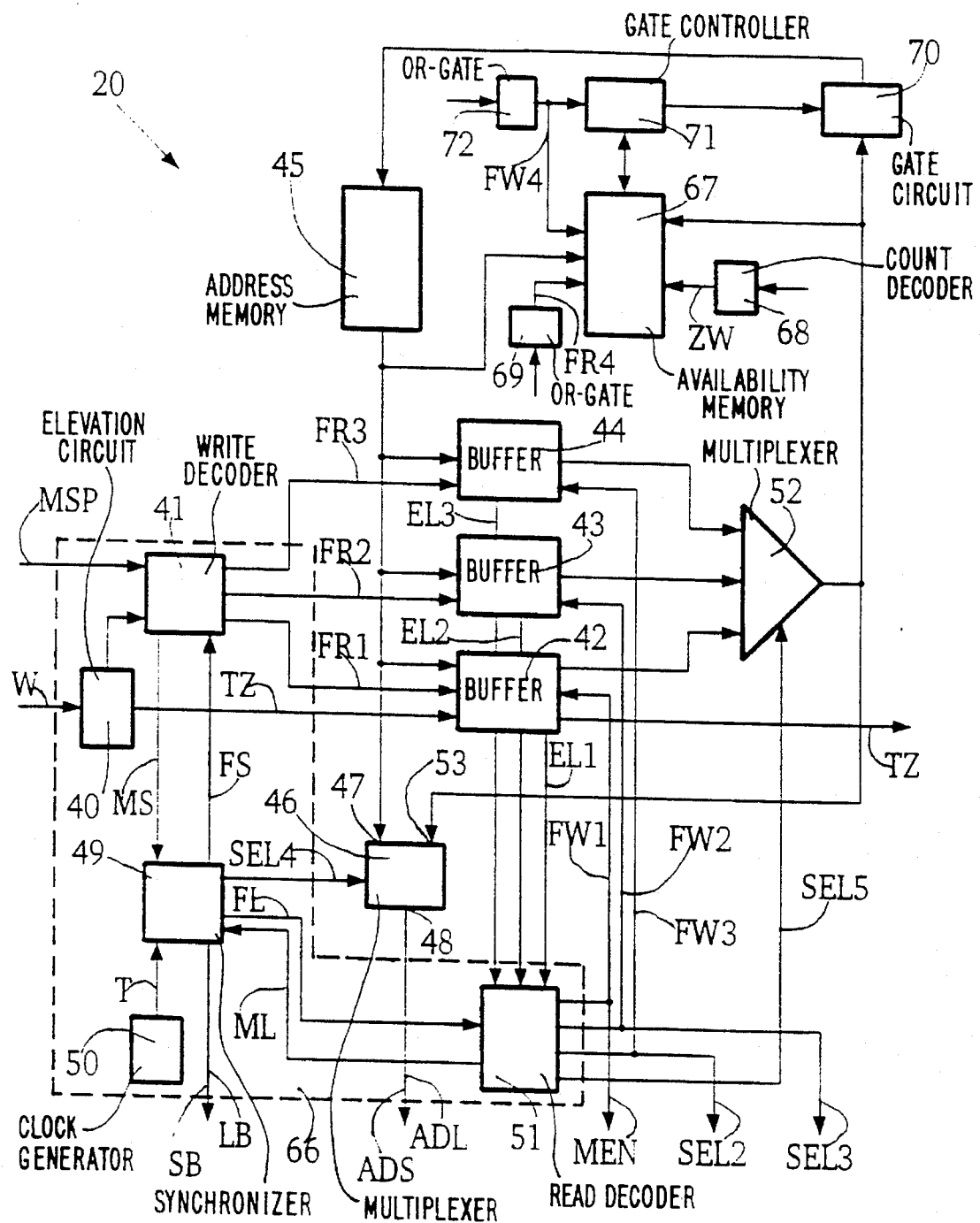
FIG. 3 shows a main buffer controller inserted in the network interface.

FIG. 3 shows an illustrative embodiment of a main memory controller 20. An evaluation circuit 40 included in the main memory controller 20 takes from the routing indicator W supplied by the input multiplexer 17 the destination(s) of a cell to be stored in the main memory 19 and conveys this information about the destination to a write decoder 41 and, if available, a Table pointer TZ included in the routing indicator to a buffer 42 to be buffered. When the write decoder 41 has received a message via the message signal MSP from the receive controller 29 that a cell is to be stored, and further signals which will be explained below, the write decoder 41 releases one or several of the three buffers 42, 43 and 44 via a release signal FR1, FR2 or FR3, respectively. Which buffer 42, 43 or 44 is released depends on the destinations of the cell. If the cell is to be fed to the send ring line 12, the buffer 44 is released for writing an address supplied by an address memory 45. If the destination of the cell is the internal connection 14, the buffer 43 is released for writing an address coming from address memory 45. The buffer 42 is released if the cell is to be fed to the input annex storage 30. Either one or several of the buffers 42, 43 or 44 may be released (single path or multipath transmission of a cell). The Table pointer TZ supplied by the evaluation circuit 40 cannot be written until the buffer 42 is released for writing an address.

The address produced by the address memory 45 is also stored in an availability memory 67 together with a count. A count stored at the address produced by the address memory 45 is formed by a count decoder 68. For this purpose, the count decoder 48 is supplied with the release signals FR1, FR2 and FR3, which decoder forms therefrom a count in accordance with the following Table:

| FR3 | FR2 | FR1 | count decimal | binary |
|---|---|---|---|---|
| 0 | 0 | 1 | 1 | 01 |
| 0 | 1 | 0 | 1 | 01 |
| 0 | 1 | 1 | 2 | 10 |
| 1 | 0 | 0 | 1 | 1 |
| 1 | 0 | 1 | 2 | 10 |
| 1 | 1 | 0 | 2 | 10 |
| 1 | 1 | 1 | 3 | 11 |

The release signals FR1 to FR3 have the value "1" if they release a buffer 42, 43 or 44. For example, if the release signal FR3 releases the buffer 44 and the release signal FR1 releases the buffer 42, the count decimal "2" or binary "10" will be formed in the count decoder 68. For an address and a count to be written in the availability memory 67, it is necessary that this memory is released beforehand via a release signal FR4. This release signal FR4 is derived via an OR-gate 69 from the release signals FR1 to FR3.

Figure 4:
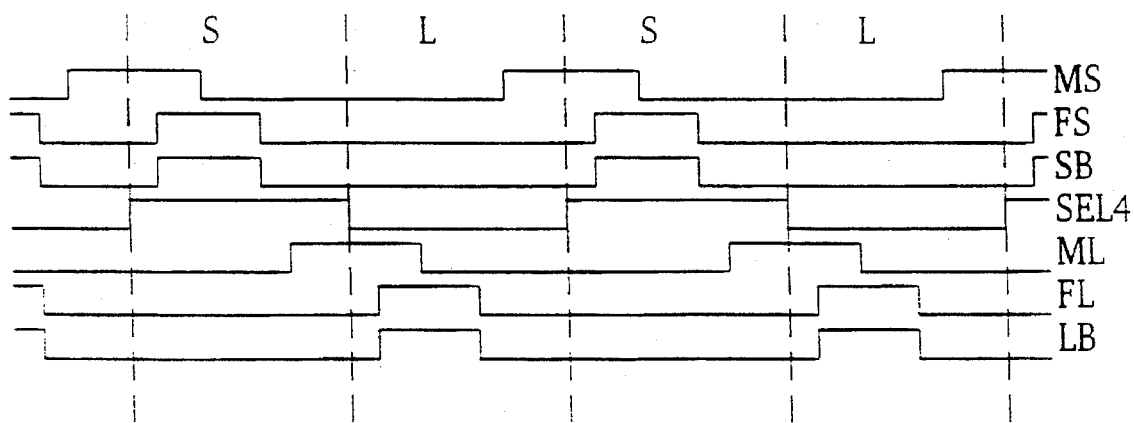
FIG. 4 shows a time diagram in explanation of the operation of the main buffer controller shown in FIG. 3.

The address written in a buffer 42, 43 or 44 is also fed to a first input 47 of a multiplexer 46. When the first input 47 of the multiplexer 46 is connected to its output 48, the main memory controller 20 feeds a write address ADS to the main memory 19. The multiplexer 46 is controlled via a selection signal SEL4 by a synchronizer 49 which receives an independent clock signal T from a clock generator 50. The synchronizer 49 generates a write cycle S and a read cycle L (compare FIG. 4). During a write cycle S the output 48 of the multiplexer 46 is connected through its first input 47 to the output of the address memory 45.

The write decoder 41 announces via a message signal MS (compare FIG. 4) to the synchronizer 49 when a cell is to be written in a buffer 42, 43 or 44. During the write cycle the synchronizer 49 then informs the write decoder 41 via a release signal FS that the buffers 42 to 44 may be released to be written in. The synchronizer 49 furthermore switches a write release signal SB to the main memory 19.

The main memory controller 20 further includes a read decoder 51 which controls the reading from the buffers 42, 43 and 44. As a rule, the read decoder alternately releases via three release signals FW1, FW2 and FW3 the buffers 42 to 44, so that a stored address can be read out. However, if no address occurs in a buffer 42 to 44, this empty buffer 42, 43 or 44 is not released. If no address is found, each buffer 42 to 44 sends a message to the read decoder 51 via message signals EL2, EL3 and EL4.

The read decoder 51 informs via a message signal ML (compare FIG. 4) the synchronizer when a buffer 42, 43 or 44 is to be released. In the case of a read cycle L, the synchronizer 49 informs the read decoder 51 via a release signal FL that this decoder may release a buffer 42 to 44 for an address to be read out. After the release via the release signal FW1, FW2 or FW3, the address is led from a buffer 42, 43 or 44 via a multiplexer 52 to a gate circuit 70, on the one hand, and to the second input 53 of the multiplexer 46, on the other. The multiplexer 52 further receives a selection signal SEL5 from the read decoder 51. If the buffer 42 receives the release signal via the read decoder 51, also a stored Table pointer TZ is fed to the Table 32.

The gate circuit 70 is controlled by a gate controller 71 coupled to the availability memory 67. When an address is supplied by the multiplexer 52, this address is fed to the availability memory 67. Via a release signal FW4 the availability memory 67 is released for the gate controller 71 to read out the count stored at the address. The gate controller 71 formed by logic modules can be elucidated in the light of the following procedure:

1. When release is effected via release signal FW4, the count is decremented;
2. The new count is stored in the availability memory 67;
3. Is new count equal to zero?
4. Yes: Gate circuit is opened;
5. No: Gate circuit continues to be closed.

After the release via the release signal FW4, the count received from the availability memory 67 is decremented in the gate circuit 71. The decremented count is then again written in the availability memory 67. If the count is equal to zero, the gate circuit 70 is opened, so that the address supplied by the multiplexer 52 can reach address memory 45 and be written in the memory. If the count is unequal to zero, the gate circuit 70 continues to be closed. The count which is supplied by the count decoder 68 denotes the number of copies of a cell. If the count is equal to 3, a cell is to be fed to the send ring line 12, to the internal connection 14 and to the control arrangement 26. The release signal FW4 is formed by an OR gate 72 which receives the release signals FW1, FW2 and FW3.

The release signals FW1, FW2 and FW3 also form the selection signals SEL2 and SEL3 and the message signal MEN for the access controller 31, implying that a cell is to be written in the input annex storage 30. The address memory 45 operates according to the FIFO principle (FIFO= First-In, First-Out). After all the addresses have been read out once, the re-entered addresses are read out again by the address memory 45 in the order in which they arrived.

During the read cycle L, the selection command SEL4 (compare FIG. 4) is switched so that the second input 53 of the multiplexer 46 is connected to its output 48. In this manner a buffer 42, 43 or 44 feeds the address as a read address to the main memory 17 via the multiplexers 52 and 46. The synchronizer 49 allows of the reading of a cell from the main memory 19 during the read cycle L. The possibility to read is announced to the main memory 19 via a read signal LB.

It should further be observed that the evaluation circuit 40, the write decoder 41, the synchronizer 49, the clock generator 50 and the read decoder 51 form a decoding device 66.

Figure 5:
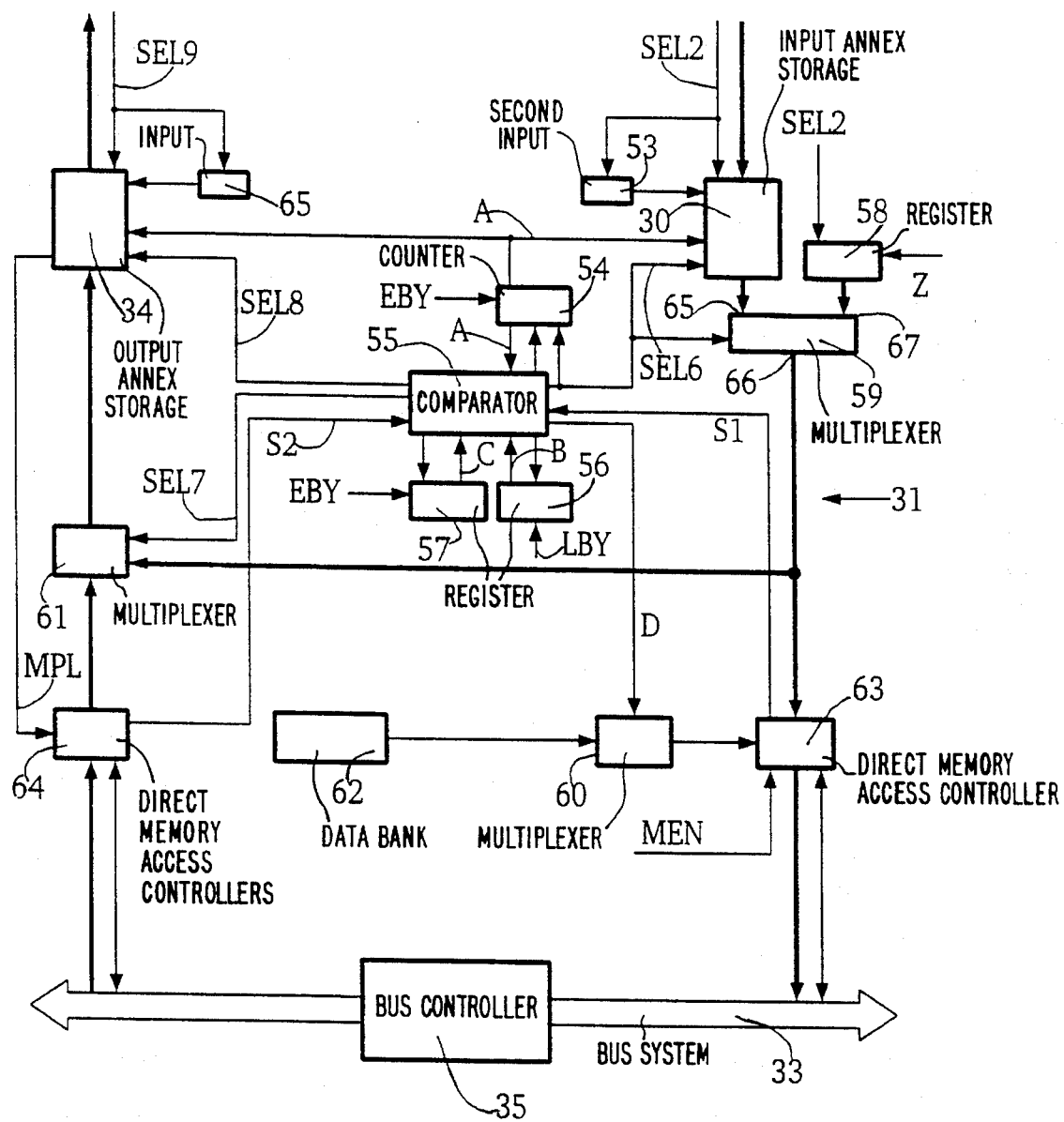
FIG. 5 shows an access controller inserted in the network interface.

FIG. 5 shows an illustrative embodiment for the access controller 31 which receives cells via the input annex storage 30 from the coupling device 18 and feeds cells to the coupling device 18 via the output annex storage 34. The access controller 31, which forms part of the control arrangement 26, directs cells, bytes of a cell and/or additional information Z coming from the Table 32 to the bus system 33 which, together with the bus controller 35, the interface 37, the arithmetic logic unit 36, the memory module 38 and the memory controller 39, forms part of a processing system. Furthermore, the access controller 31 supplies cells to the output annex storage 34.

The write operation in the input annex storage 30 is controlled by a counter 53 which is started by the selection signal SEL2 and which generates write addresses for the input annex storage 30. The input annex storage 30 is also released via the selection signal SEL2 for a cell to be entered. The byte of a stored cell of the input annex storage 30 is read by a counter 54. The counter 54 forms part of the access controller 31 as do a comparator 55, three registers 56, 57 and 58, three multiplexers 59, 60 and 61, a data bank 62 and two direct memory access controllers 63 and 64.

The Table pointer TZ is fed to the Table 28 in that a cell is transmitted via the demultiplexer 21 to the input annex storage 30. The Table 28 supplies to the access controller 31 at the address featured by the Table pointer TZ additional information Z and/or the address of the first and last bytes to be transmitted (EBY, LBY) of the cell to be stored in the input annex storage 30. The additional information Z supplied by the Table 32 is stored in the register 58 via the selection signal SEL2.

Via the message signal MEN, the direct memory access controller 63 receives v/a switch 22 a message from the main memory controller 20 when a cell is written from the main memory 19 into the input annex storage 30. As is customary in known direct memory access controllers, the direct memory access controller 63 queries the bus controller 35 about the bus system 33 whether a transfer of bytes is possible. If such a transfer, for example, to the interface 37 is released, the direct memory access controller 63 informs the comparator 55 of this fact via a start signal S1. After being released via the start signal S1, the comparator 55 provides that the address EBY of the first byte stored in the input annex storage 30 is written in the counter 54 and the register 57, and the address LBY of the last byte to be transmitted is written in the register 56.

Once the direct memory access controller 63 has been released, the comparator 55 compares the count A of the counter 54 with the contents B of the register 56. If the contents B of the register 56 exceed the count A of the counter 54, a selection signal SEL6 generated by the comparator 55 causes the counter 54 to increment, the input annex storage 30 to be released for reading out the bytes and the multiplexer 59 to be arranged so that bytes of the input annex storage can reach the output 66 of the multiplexer 59 via the input 65. The counter 54 supplies addresses to the input annex storage 30 for the read process.

If the comparator 55 establishes that the count A of the counter 54 is equal to the contents B of the register 56, the counter 54 is blocked via the selection signal SEL6 and the reading of the input annex storage 30 is blocked. Furthermore, via selection signal SEL6, the second input 67 of the multiplexer 59 is connected to its output 66. If additional information Z is stored in the register 58, this information is transmitted to the direct memory access controller 63.

The direct memory access controller 63 is informed in a certain predefined format by the data bank 62 of how many bytes are transmitted from the input annex storage 30 to the bus system 33. Immediately after the write operation the comparator 55 therefore calculates the difference between the addresses EBY and LBY of the first and last bytes. This difference D is used for switching the multiplexer 60, so that the information goes from the data bank 62 to the direct memory access controller 63 in the specified predefined format. Once this information has been received, the direct memory access controller 63 informs the bus system 33 or bus controller 35 of how many bytes are to be transmitted. If the difference is equal to 0, the data bank 62 informs the direct memory access controller 63 that additional information is produced by the multiplexer 59.

Bytes of a cell or a whole cell are read from a unit coupled to the bus system 33 via the further direct memory access controller 64. The bus controller 35 announces via the bus system 33 to the direct memory access controller 64 that bytes are to be transmitted from a unit coupled to the bus system to the output annex storage 34. The direct memory access controller 64 can send bytes to the output annex storage 34 only when this annex storage has previously announced to the direct memory access controller via a message signal MPL that a cell has been stored. If the direct memory access controller 64 is ready for transmission, the comparator 55 is informed thereof via a start signal S2.

After the comparator 55 has been released via the start signal S2, the counter 54 is set to zero and released for upcounting. The counter 54 generates all the addresses for the read process in the output annex storage 34. The comparator 55 compares the count A of the counter 54 with the contents B of the register 56 which register has stored the address of the last byte to be transmitted to the bus system 33, and the contents C of the register 57 which register has stored the address of the first byte to be transmitted to the bus system.

If in a first case $A=B=C=0$ or $A<C$, $A<B$, $B<52$, or $A>C$, $A>B$, $A\leq52$, the reading from the input annex storage 30 is released via the selection signal SEL6 and the multiplexer 59 is arranged so that its first input 65 is connected to its output 66. The addresses of the counter 54 are also used then. The comparator 55 generates two more selection signals SEL7 and SEL8 for controlling the output annex storage 34 and the multiplexer 61. The selection signal SEL8 causes in said case the output annex storage 34 to be released to be read out. In the first case the selection signal SEL7 causes bytes to go from the multiplexer 59 to the output annex storage 34 via the multiplexer 61. It should further be observed that the count 52 is obtained in that the counter 54 starts counting at zero and 53 bytes are contained in a cell.

In the second case, if $A\geq C$, $A\leq B$, $B<52$ or $C=B=52$ or $A=52$, the comparator 55 sets the selection signal SEL in such a way that the reading from the input annex storage 30 is blocked. The selection signal SEL7 controls the multiplexer 61 in such a way that the output annex storage 34 receives cells from the direct memory access controller 64.

If the counter 54 denotes a count 52, it is blocked by the comparator 55. At least the selection signal SEL8 is changed, so that after the last byte of the cell has been written in the output annex storage 34, this annex storage is blocked as regards writing.

If a cell is buffered in the output annex storage 34, the receiving circuit 25 is informed of this fact. If the cell can be evaluated in the receiving circuit 25, this circuit releases the reading of the cell from the output annex storage 34 via a release signal SEL9. Furthermore, a counter 65 is started which generates from the output annex storage 34 the addresses for the read operation.

Additional information is supplied to the bus system 33 by the access controller 31, for example, if cells are counted for a specific connection, for example, for an allocation of charges. Cells used for monitoring purposes include monitoring information, for example, in the first byte of the information field of the cell. In this case only the header field and the first byte of the information field could be applied to the bus system by the access controller 31. If, for example, a cell is used for transmitting an ATM ¾ type adaptation layer, the access controller 31 transmits in that case 44 bytes of the information field to the bus system 33.

We claim:

1. Local area network operating in an asynchronous transfer mode (ATM) comprising:

a plurality of stations which are coupled each via a network interface, wherein each network interface comprises a coupling device and a control arrangement and transmits cells via the coupling device, between send and receive ring lines, to at least one of said plurality of stations and at least one control arrangement, wherein said at least one control arrangement comprises an access controller which is arranged for conveying, in dependence on the contents of a header field of a cell received from the coupling device, one of the following selected from the group consisting of (i)

the cell, (ii) first parts of the cell, and (iii) additional information to a bus system and units coupled to the bus system.

2. The local area network as claimed in claim 1, wherein the access controller is provided for conveying one of the following selected from the group consisting of (i) the cell processed by at least one unit, (ii) first parts of the cell processed in at least one unit, (iii) a non-processed cell, and (iv) non-processed remaining parts of the cell to the coupling device.

3. The local area network as claimed in claim 2, wherein for combining the non-processed and processed parts of a cell in a simple manner, a control arrangement comprises an input annex storage for buffering at least a cell received from the coupling device and an output annex storage for buffering at least a cell to be sent to the coupling device and wherein the access controller is then provided for controlling a reading of a cell from the input annex storage and a writing of a cell in the output annex storage.

4. The local area network as claimed in claim 3, wherein a first Table is available which provides for the access controller one of the following selected from the group consisting of (i) an address of a first and a last byte of a cell to be transmitted to the bus system, and (ii) additional information in dependence on the contents of the header field of the cell buffered in the input annex storage.

5. The local area network as claimed in claim 4, wherein the access controller (31) comprises a first register for storing the additional information supplied by the first Table, a first multiplexer for conveying the bytes of a cell coming from the input annex storage or additional information coming from the first register, a second multiplexer for conveying the bytes coming from the input annex storage or from the bus system to the output annex storage, a counter for producing addresses for the reading of bytes from the input annex storage and for changing its count after a byte of a cell has been read from the input annex storage, and a comparator provided for controlling the first and second multiplexer in dependence on the count and on the first and last address of the bytes to be transmitted to the bus system.

6. The local area network as claimed in claim 5, wherein once a cell has been written in the input annex storage, a second register is used for receiving the address of the last byte to be transmitted and a third register as well as an up-counter for receiving the address of the first byte to be transmitted, and wherein the comparator is arranged for (a) comparing the count of the up-counter with the contents of the second register, (b) coupling, via the first multiplexer, the input annex storage to the bus system if the count is smaller than the contents of the second register and (c) coupling, via the first multiplexer, the first register to the bus system if the count is equal than or larger than the contents of the second register, and wherein subsequently the comparator is arranged for resetting the up-counter to the address of the first byte of the cell, comparing the count with the contents of the second and third registers, coupling, via the first multiplexer, the input annex storage to the second multiplexer, coupling, via the second multiplexer, the output annex storage to the bus system if (a) the count is larger than or equal to the contents of the third register and the count is smaller than or equal to the contents of the second register, or (b) the contents of the second and third registers or the count correspond to the address of the last byte of the cell, and coupling, via the second multiplexer, the output annex storage to the first multiplexer, if (a) the count and the contents of the second and third registers are equal to the address of the first byte of a cell, or (b) the count is smaller than the contents of the second and third registers and the contents of the second register are unequal to the address of the last byte of the cell, or (c) the count is larger than the contents of the second and third registers and the count is not larger than the address of the last byte of the cell.

7. The local area network as claimed in claim 5, wherein a receive ring line, a first connection delivering a cell from a station and a second connection delivering a cell from a control arrangement are coupled to the coupling device via their own receiving circuits, wherein a receiving circuit is provided for adding via a routing Table a Table pointer to a cell that has a control arrangement as its destination, and wherein the coupling device is provided for separating from the cell the Table pointer which serves as an address for an item of the contents of the first Table, and for feeding the Table pointer to the first Table.

8. Network interface for a local area network operating in an asynchronous transfer mode (ATM), to which interface at least one station is coupled, said network interface comprising: a coupling device and a control arrangement and wherein said network interface transmits cells via the coupling device between send and receive ring lines, at least one station and at least one control arrangement, wherein a control arrangement comprises an access controller which is provided for conveying, in dependence on the contents of a header field of a cell received from the coupling device, one of the following selected from the group consisting of (i) the cell, (ii) first parts of the cell, and (iii) additional information to a bus system and units coupled to the bus system.

9. The local area network as claimed in claim 6, wherein a receive ring line, a first connection delivering a cell from a station and a second connection delivering a cell from a control arrangement are coupled to the coupling device via their own receiving circuits, wherein a receiving circuit is provided for adding via a routing Table a Table pointer to a cell that has a control arrangement as its destination, and wherein the coupling device is provided for separating from the cell the Table pointer which serves as an address for an item of the contents of the first Table, and for feeding the Table pointer to the first Table.

* * * * *